US005789661A

United States Patent [19]
Fauqué et al.

[11] Patent Number: 5,789,661
[45] Date of Patent: Aug. 4, 1998

[54] EXTENDED RANGE AND ULTRA-PRECISION NON-CONTACT DIMENSIONAL GAUGE

[75] Inventors: Jacques A. Fauqué, Los Gatos, Calif.; Ronald D. Linder, Phoenix, Ariz.

[73] Assignee: Sigmatech, Inc., Tempe, Ariz.

[21] Appl. No.: 800,852

[22] Filed: Feb. 14, 1997

[51] Int. Cl.$^6$ .............................. G01B 13/06; G01L 9/10
[52] U.S. Cl. ................... 73/37.5; 73/37.5; 73/1 J
[58] Field of Search ...................... 73/37.5, 1 J; 118/712

[56] References Cited

U.S. PATENT DOCUMENTS

| | | | |
|---|---|---|---|
| 4,270,382 | 6/1981 | Kamman | 73/37.5 |
| 4,325,248 | 4/1982 | Kolosov | 73/37.5 |
| 4,358,960 | 11/1982 | Porter | 73/705 |
| 4,364,270 | 12/1982 | Heinzl et al. | 73/298 |
| 4,550,592 | 11/1985 | Dechape | 73/37.5 |
| 4,594,881 | 6/1986 | Imamura | 73/37.5 |
| 4,604,892 | 8/1986 | Carreras | 73/37.5 |
| 4,607,525 | 8/1986 | Turner et al. | 73/37.5 |
| 4,607,960 | 8/1986 | Wulff | 374/7 |
| 4,658,633 | 4/1987 | Freer | 73/37.5 |
| 4,724,701 | 2/1988 | Mon | 73/37.5 |
| 4,953,388 | 9/1990 | Barada | 73/37.5 |
| 4,986,111 | 1/1991 | Sidey | 73/37.5 |
| 5,087,927 | 2/1992 | Thomas et al. | 346/108 |
| 5,121,688 | 6/1992 | Williams et al. | 101/142 |
| 5,140,846 | 8/1992 | DeCool et al. | 73/37.5 |
| 5,163,312 | 11/1992 | Ayers | 73/37.5 |
| 5,298,073 | 3/1994 | Wilson | 118/712 |
| 5,540,082 | 7/1996 | Okuyama et al. | 73/37.5 |

FOREIGN PATENT DOCUMENTS 1382706  2/1975  United Kingdom.

OTHER PUBLICATIONS

Jacques Fauque, "Air Gaging", *Measurements & Control*, Apr. 1991.

*Primary Examiner*—Hezron E. Williams
*Assistant Examiner*—J. David Wiggins
*Attorney, Agent, or Firm*—Thomas E. Schatzel; Law Offices of Thomas E. Schatzel A Prof. Corporation

[57] ABSTRACT

A non-contact pneumatic-electric dimensional measurement system comprises a stable base on which a semiconductor wafer or workpiece to be measured is placed. A measurement head is held aloft over the wafer or workpiece and base by a rigid support bracket attached to the base. The tip of an air nozzle in the measurement head is directed at the wafer or workpiece and automatically extended to near contact. The nozzle is servo-positioned by an air sensor and motor combination that maintains an air gap between the tip and wafer of about 150 microns with an overall precision of about 3–4 microns. A Heidenhaim linear displacement gauge is attached to the air nozzle and is used to determine the nozzle position to within 0.5 micron. The dimension of the wafer or workpiece is determined to within 0.5 micron by combining the linear displacement gauge reading with an estimate of the air gap derived from a reading of the air nozzle backpressure that has an accuracy of about 0.1 micron. A calibration method is used while the air sensor and motor servo combination is temporarily disabled. The nozzle is stepped in ten micron increments of air gap from a reference starting at zero using readings from the linear displacement gauge. The specific back pressure in the air sensor is read into a linearization table for 0–300 microns in ten micron steps.

11 Claims, 1 Drawing Sheet

EXTENDED RANGE AND ULTRA-PRECISION NON-CONTACT DIMENSIONAL GAUGE

BACKGROUND OF THE INVENTION

1. Field of the Invention

The invention relates generally to methods and systems for gauging the thickness of semiconductor wafers and other workpieces and more specifically to hybrid technologies that combine optical displacement encoders, pneumo-electric sensors and other sensors to obtain coarse thickness measurements from the displacement encoders and fine thickness measurements from analog readings derived from pneumo-electric sensors.

2. Description of the Prior Art

In many situations it is very desirable to avoid actual hard contact of a thickness gauge with a workpiece. Gauges that depend on contact may not be intrinsically safe, and surface textures, colors, and material constituencies can prevent high precision measurement accurate to the submicron level.

One type of non-contact sensing, pneumatic gauging, is based on measuring the backpressure of compressed air flow to a nozzle in very close proximity to a workpiece surface. U.S. Pat. No. 4,550,592, issued Nov. 5, 1985, describes a pneumatic gauging circuit invented by Michel L. Dechape. The air gap between the nozzle outlet and the surface can be estimated. The back pressure in a chamber through which compressed air is flowing via a restricted orifice can also be used to estimate the air gap distance. Such back pressure is function of the distance that separates the tip of the nozzle connected to the chamber and the adjacent surface of the workpiece. For precise measurements, the supply air pressure to the back pressure circuits must be precisely regulated.

Michel L. Dechape describes in 1985 that conventional back pressure pneumatic gauging circuits used a pressure gauge zero or datum control provided by an adjustable bleed orifice between a back pressure chamber and the atmosphere.

Differential back pressure measurement circuits are less sensitive to regulator pressure variations because the output pressure variations will appear as common mode noise to the detector, and the measurement information can be taken in differential mode. Two air flow branches are used from a common inlet to separate outlets. The flow of air to a measurement pressure chamber is regulated in each branch by a fixed control orifice. One of the pressure chambers is connected to a pneumatic gauge nozzle affected by the measurement air gap. The other pressure chamber is vented to atmosphere through a reference orifice for datum control. An expansible bellows is connected in prior art systems to each pressure chamber. A flexible diaphragm can also be used to separate the two pressure chambers. The differential motion is detected and measured as a function of the difference of pressure in the pressure chambers. The extent of such differential motion is related to the air gap between the air gauge nozzle and the adjacent surface of the workpiece. Any fluctuations in supply air pressure due to poor regulation will cancel if back pressure is the same on both sides.

The measured air back pressure can be displayed relative to a calibrated scale graduated in thousandths of an inch or millimeters. Prior art scales are generally placed vertically on or along a glass tube, e.g., as with a U-tube manometer. Pointer-dial dimension display instruments are typically mechanically connected to the moving end of a bellows or flexible diaphragm in differential back-pressure circuits. Bourdontube pressure gauges and other pointer-dial instruments can be directly connected to the pneumatic circuit pressure chamber. But for the sake of convenience, the measurement display instruments are usually remotely located either pneumatically or electrically by connection to a pressure transducer.

In some conventional pneumatic gauging systems, the measurement display instrument is electrically driven, even though it may be in the apparently traditional form of a vertical scale instrument. The pressure transducer generally takes the form of a metallic diaphragm, bellows or capsule which, directly or through a series of motion amplifying levers, displaces the input member of a probe such as a piezo resistor, a variable resistor such as a linear potentiometer, or, in the majority of systems, a displacement transducer taking the form of a variable transformer having a movable core for varying the mutual inductance between the primary and secondary windings of the transformer as a function of the displacement of the core. The input member of the displacement transducer displaces the movable core. The primary winding of the transducer transformer is connected across a power supply providing ten volts peak-to-peak, for example, at a predetermined frequency in the range generally of 5–10 Khz. The amplitude of the signal, output voltage across the secondary is a function of the linear displacement of the transformer core. The output signal, after being demodulated, or rectified, and amplified, is read by a voltmeter. More traditionally in pneumatic gauging technology, in the form of a vertical scale instrument imitating a U-tube manometer display. Pressure transducers are also used to drive analog to digital converters to present a digital display representing the air gap dimension.

SUMMARY OF THE PRESENT INVENTION

It is therefore an object of the present invention to provide an automated system for measuring the dimensions of semiconductor wafers and other workpieces.

It is another object of the present invention to provide a method for combining mechanical displacement measures accurate to only several microns with pneumatic-electric measurements having accuracies better than 0.1 micron.

Briefly, a non-contact pneumatic-electric wafer measurement system embodiment of the present invention comprises a stable base on which a semiconductor wafer to be measured is placed. A measurement head is held aloft over the wafer and base by a rigid support bracket attached to the base. The tip of an air nozzle in the measurement head is directed at the wafer and automatically extended to near contact. The nozzle is servo-positioned by an air sensor and motor combination that maintains an air gap between the tip and wafer of about 150 microns with an overall precision of positioning of about 3–4 microns. A Heidenhaim linear displacement gauge is attached to the air nozzle and is used to determine the nozzle position to within 0.5 micron. The thickness of the wafer is determined to within 0.5 micron by combining the linear displacement gauge reading with an estimate of the air gap derived from a reading of the air nozzle backpressure that has an accuracy of about 0.1 micron. Thus the motor positioning error is removed. A calibration method is used while the air sensor and motor servo combination is temporarily disabled. The nozzle is stepped in ten micron increments of air gap from a reference starting at zero using readings from the linear displacement gauge. The specific back pressure in the air sensor is read into a linearization table for 0–300 microns in ten micron steps.

An advantage of the present invention is that a non-contact measurement system is provided with accuracies better than 0.5 micron.

A further advantage of the present invention is that non-contact pneumatic-electric method is provided for combining linear displacement readings and back pressure readings from an air sensor that overcomes inaccuracies introduced by a servo mechanism.

These and many other objects and advantages of the present invention will no doubt become obvious to those of ordinary skill in the art after having read the following detailed description of the preferred embodiments which are illustrated in the drawing figure.

IN THE DRAWINGS

FIG. 1 is a functional block diagram of a semiconductor wafer measurement system embodiment of the present invention.

DETAILED DESCRIPTION OF THE PREFERRED EMBODIMENTS

Figure 1:
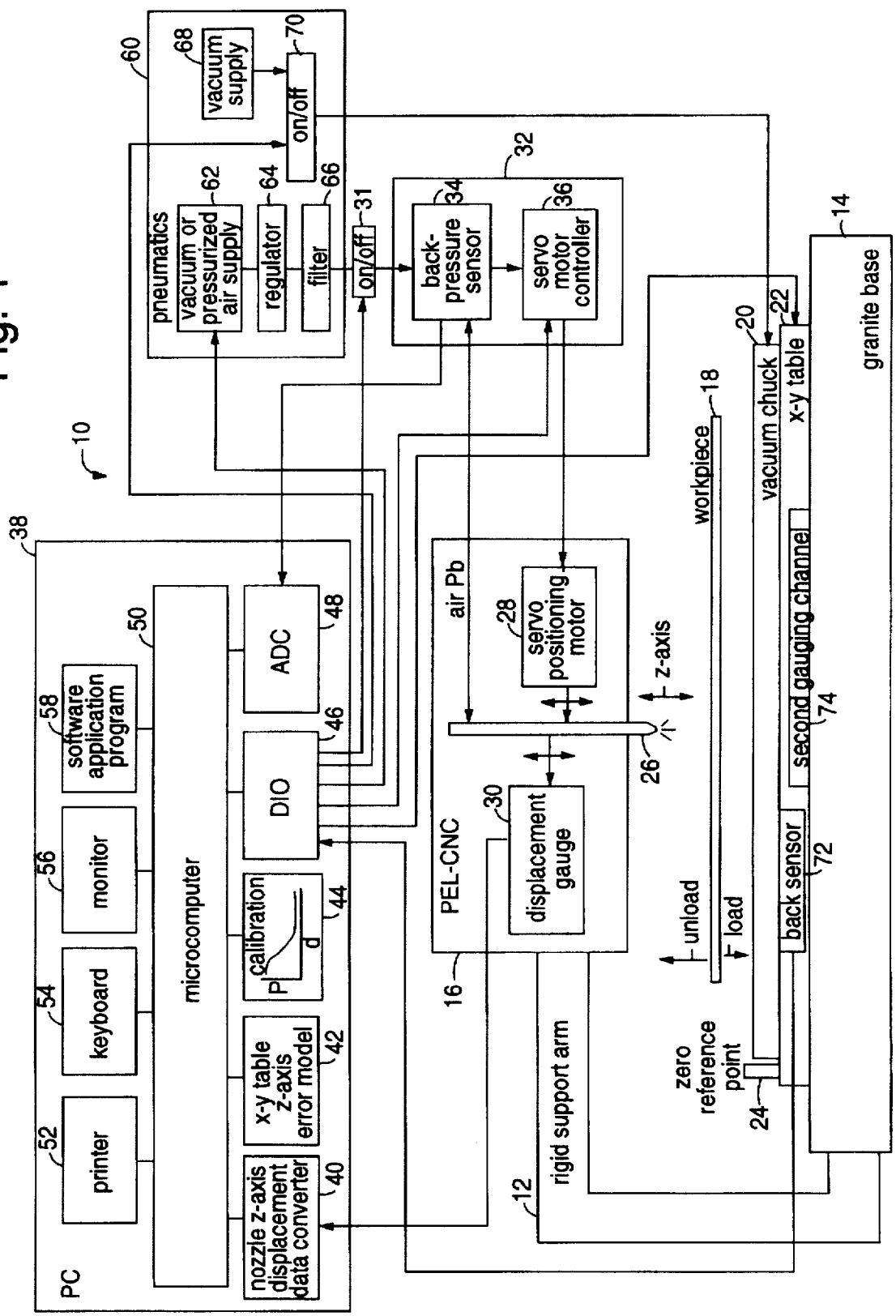

FIG. 1 illustrates a semiconductor wafer thickness gauging system embodiment of the present invention, referred to herein by the general reference numeral 10. The system 10 comprises a rigid support arm 12 that is attached between a granite block base 14 and a measurement head 16. A workpiece to-be-measured 18, e.g., a semiconductor wafer is manually loaded and unloaded by a user into and out of a vacuum chuck 20. An x-y table 22 sits on the granite block base 14 and can be electronically controlled to move the wafer 18 to various x-y positions, e.g., in a horizontal plane. A z-axis reference point 24 is carried by the x-y table 22 and can be positioned at a point nadir to the measurement head 16, and especially beneath a nozzle 26. A servo-positioning motor 28 is connected to be able to zero position the tip of the nozzle 26 at near zero altitude over the reference point 24, and to retract the nozzle 26 high enough to be able to load and unload the wafer 18 in the vacuum chuck 20, and at various points in between. The nozzle 26 may comprise a sensing tip of sapphire material with a one millimeter diameter. The typical z-axis range of the position of the nozzle 26 controlled by the motor 28 is about twenty-five millimeters. A precision displacement gauge 30, e.g., an optical displacement encoder, is mechanically connected to the nozzle 26. There is an on/off switch 31 controlled by DIO 46.

A constant-air-gap controller 32, e.g., a Sentex Corporation (Santa Clara, Calif.) model PEL-A, is used to routinely control the position of the tip of the nozzle 26 relative t:o the top surface of the wafer 18 to have an air gap of about 150 microns. An air sensor 34 is connected to receive a regulated and filtered air flow through a restrictor before passing it on to the nozzle 26. The Sentex back-pressure sensor uses a MAWOMATIC proprietary differential back-pressure sensor. As the tip of the nozzle 26 approaches the top surface of the wafer 18, a back pressure (Pb) builds. For example, such position-dependent variable back pressure can be measured differentially or absolutely by a piezo-resistive Wheatstone bridge. For further information on such sensors, see U.S. Pat. No. 4,594,881, issued Jun. 17, 1986, to Takumi Imamura. The positioning detector described by Tomoyuki Okuyama, et al., in U.S. Pat. No. 5,540,082, issued Jul. 30, 1996, is also of interest. U.S. Pat. No. 4,550,592, issued Nov. 5, 1985, describes a pneumatic gauging circuit invented by Michel L. Dechape. Such patents are incorporated herein by reference. Also see, "Air Gaging", an article published in the Apr. 1991 edition of *Measurements & Control*, by one of the present inventors, Jacques Fauque.

Dechape describes a bridge-type circuit for pneumatic gauging. An inlet and two branch passageways allow a flow of compressed air that passes from an inlet to an outlet of each branch passageway to be controlled by an adjustable orifice. One of the outlets is connected to the nozzle, or nozzles, of an air gauge head. The pressure of the air flowing past the corresponding adjustable orifice varies as a function of the distance separating the nozzle from the surface. The other branch passageway is vented to atmosphere through a calibrated orifice to establish a zero reference. The differential pressure between the passageways downstream of the adjustable control orifices is monitored by a differential pressure transducer and such provides a measurement signal. In the alternative, the outlet of the second branch passageway is also connected to the nozzle, or nozzles of an air gauge head, for differential measurements.

A personal computer (PC) 38, capable of running the Microsoft WINDOWS disk operating system, includes a data converter 40 built on a PC-compatible printed circuit board (PCB). For example, a three-axis encoder interface card for An optical linear and rotary encoders may be used, and such are available from IMS of Haifa, Israel (ims@actcom.co.il). An x-y table z-axis error model 42 and a pressure-versus-distance calibration table 44 are stored in memory. The x-y table z-axis error model 42 represents empirical measurements of the z-axis at various x-y points of the x-y table 22 when positioned under the measurement head 16. Such measurements are more usefully translated into correction factors that offset the thickness measurements of the wafer 18 during operation in a gauging mode. The pressure-versus-distance calibration table 44 is built from measurements taken while the nozzle 26 is positioned over the reference point 24. For example, the reading of the air sensor 34 is recorded for every ten micron increment from zero of the nozzle by the servo positioning motor 28 as judged by the displacement gauge 30. Calibrations ranging 0–300 microns have been found to be sufficient. An S-shaped pressure-versus-distance function results, with the maximum back pressure (Pb) equaling the supply air pressure when the tip of the nozzle 26 is closed by being at zero altitude over the reference point 24. During such calibration mode, a servo position feedback signal from the air sensor 34 to the servo motor controller 36 is disabled or otherwise prevented from maintaining the air gap distance at about 150 microns, as is done during measurement mode.

A digital input/output (DIO) card 46 provides x-y axis control signals to the x-y table 22, z-axis control signals to the servo motor controller 36, and on/off control signals for air supply and vacuum pneumatics. An analog-to-digital converter (ADC) 48 converts a non-linearized analog signal from the piezo-resistive Wheatstone bridge in the air sensor 34 to a digital word for manipulation by a microcomputer core 50. A printer 52 provides general hardcopy outputs. A keyboard.54 and a monitor 56 allow a user to supervise, control, and select between calibration and measurement operational modes. A software application program 58 provides program instructions specific to the proper sequencing of the various components of the system 10. Such program 58 is typically distributed and loaded separately by conventional CD-ROM disk or floppy disk means.

A pneumatics control module 60 includes a source of vacuum or pressurized air 62 that is controlled on/off by the software application, program 58 via the microcomputer 50 and the DIO 46. A regulator 64 provides a constant air pressure and a filter 66 removes particles that could clog or otherwise disrupt the proper functioning of the air sensor 34 and nozzle 26. A vacuum supply 68 has an on/off pneumatic switch 70 that is also controlled by the software application program 58 via the microcomputer 50 and the DIO 46. Vacuum is applied to the vacuum chuck 20 to lock in and hold the wafer 18 during measurement mode.

The overall accuracy of z-axis measurement of the thickness of the wafer 18 is preferably such that the resolution is better than 0.1 micron and the repeatability is better than ±0.5 micron. The closed servo loop that comprises the servo positioning motor 28, the servo motor controller 36 and the air sensor 34 tries to maintain a nozzle tip to wafer surface gap that is constant, e.g., 150 microns. But such feedback mechanisms alone have been observed to provide overall precisions of 3–4 microns. The z-linear displacement sensor combination of gauge 30 and data converter 40 can gauge increments of 0.5 micron. The air sensor 34 itself has been observed to provide gap sensing precisions of 0.1 micron. So the present invention critically depends on the combining of measurements obtained from both the air sensor 34 and the z-linear displacement sensor combination of gauge 30 and data converter 40.

In alternative embodiments of the present invention, a back sensor 72 is included in the x-y table under the vacuum chuck 20. A signal is provided to the DIO 46 to verify the presence and correct lock-in of the wafer 18. A second gauging channel 74 may be included to eliminate errors caused by inadvertent elevation of the wafer in relation to the measurement head 16. Such second gauging channel may comprise a combination of elements similar to the measurement head 16 and the constant-air-gap controller 32 that are coaxial and in opposition to the first gauging channel and on opposite sides of the wafer 18. The second gauging channel 74 preferably shares the resources of the PC 38 and the pneumatic module 60. Therefore the first gauging channel (16, 32) provides +z-axis measurement and the second gauging channel 74 provides −z-axis measurement.

A calibration method embodiment of the present invention is preferably implemented as a software program within application program 58 and is executed during calibration mode operation by the microcomputer 50. The calibration method is used for the automatic calibration of the air sensor 34 and builds a back-pressure curve versus nozzle-to-target distance in memory that is represented by the calibration table 44. No wafer 18 is required to be loaded during the execution of the calibration method. In a first: step, the x-y table 22 is commanded to position the zero reference point 24 directly under the nozzle 26. A second step disables the servo control signal from the air sensor 34 to the servo motor controller 36 that would otherwise try to keep a setpoint air gap of 150 microns (nozzle-to-target distance). In a third step, the movements of the servo positioning motor 28, and therefore the vertical displacement of the nozzle 26, are controlled according to the readings obtained from the linear displacement gauge 30. In a fourth step, the nozzle 26 is lowered to the point that its tip just contacts the zero reference point 24. Such contact can be detected electrically, or by recognizing that the backpressure seen by the air sensor 34 will reach a maximum that is equal to output pressure of the regulator 64. If the linear displacement gauge 30 has been previously calibrated, its output can be read for zero z-axis. In a fifth step, the analog reading from the air sensor 34 via the ADC 48 is logged for zero z-axis. In a sixth step, the nozzle 26 is incremented ten microns +z-axis. In a seventh step, the analog reading from the air sensor 34 via the ADC 48 is logged for the corresponding z-axis. In an eighth step, a test is made to see if the nozzle 26 has been incremented to 300 microns +z-axis. If not, the sixth and seventh steps are repeated. Otherwise, thirty-one datums 0–300 microns in ten micron increments have been collected. In a ninth step, the calibration table 44 is prepared as a lookup table and is used to linearize the readings obtained from the air sensor 34 in a gauging mode.

A gauging method embodiment of the present invention is preferably implemented as another software program within application program 58 and is executed during gauging mode operation by the microcomputer 50. The z-gauging output, e.g., displayed on the monitor 56 or printed by the printer 52, is a combination of the reading provided by the linear displacement gauge 30 and the signal output by the air sensor 34 after digitization by the ADC 48 and linearization by the calibration table 44. The linear displacement gauge 30 gauges the linear displacement of the nozzle 26 with an increment of 0.5 micron. Such displacement is auto-served to maintain a constant gap of 150 microns regardless of the thickness of the wafer 18. An error signal is sent from the air sensor 34 to the servo motor controller 36. Such feedback mechanism has a typical overall precision of 3–4 microns. The readout from the linear displacement gauge 30 must therefore be compensated to realize wafer measurement accuracies better than the overall servo accuracy. The air sensor 34 is sensitive to 0.1 micron changes in the air gap. So the signal output by the air sensor 34 after digitization by the ADC 48 and linearization by the calibration table 44 can provide nozzle-to-target estimates also accurate to 0.1 micron. The combined measurement is limited by the accuracy of the linear displacement gauge 30, and is observed in experiments to be ±0.5 micron. A program is preferably included that characterizes the z-axis positioning errors that occur at various x-y coordinates of the x-y table 22. Such vacuum chuck profile is preferably stored in the error model 42 and indexed for a correction factor to be applied to each measurement output by the gauging mode.

Overall, the application program 58 preferably allows the user to press a "start" button that will cause the x-y table 22 to move to a loading position and retract nozzle 26. The operator is allowed to manually place the wafer 18 on the vacuum chuck 20. A "go" button pressed by the user causes the x-y table 22 to move to a zero reference position. The vacuum chuck 20 is turned on to hold the wafer in place. The retracted nozzle 26 is lowered and allowed to automatically servo to its air gap setpoint of 150 microns. The microcomputer 50 reads the linear displacement gauge 30 and zeroes the readings. The nozzle 26 is retracted, and the x-y table 22 is moved to a wafer coordinate for measurement. The nozzle 26 is released, the data from the linear displacement gauge 30 and the air sensor 34 are read and stored in memory. Such nozzle retracting, x-y positioning, and nozzle releasing with a measurement are repeated for several x-y points on the wafer. At the end of the gauging sequence, the nozzle is retracted and the x-y table 22 is moved back to the loading/unloading coordinate position. The vacuum switch 70 is turned off to release the vacuum chuck hold on the wafer 18. Between each wafer being gauged, the operator is allowed to key in various identifying information at the keyboard 54, e.g., lot number, wafer number, operator name, date, etc.

In alternative embodiments of the present invention, vacuum may be used instead of air pressure. In this case the nozzle sucks in air and the amount of vacuum in the nozzle is detected. Also, stepper motors may be used instead of servopositioning motors, especially in reducing manufacturing costs.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A measurement system, comprising:

a motor-positionable probe;

an analog proximity sensor connected to a tip of the motor-positionable probe and that has an output that varies in magnitude according to the proximity of said tip to a target;

a servo motor mechanically connected to the motor-positionable probe and providing for an automatic non-contact coarse positioning of said tip within a bandgap distance having a nominal setpoint distance from said target according to said variable magnitude analog output of the analog proximity sensor;

a position gauge connected to measure the mechanical position of said tip of the motor-positionable probe; and a computer for adding a measurement obtained from the position gauge and a measurement of a tip-to-target distance estimated from said variable magnitude analog output of the analog proximity sensor;

wherein, a coarsely servo-positioned position of the motor-positionable probe is precisely determined by the position gauge, and a precise probe-to-target distance is obtained by the computer from said variable magnitude analog output of the analog proximity sensor regardless of an inexact servo-positioning of the motor-positionable probe by the servo motor.

2. The measurement system of claim 1, wherein:

the motor-positionable probe is an air nozzle that develops increased back pressure within as said tip nears said target.

3. The measurement system of claim 1, wherein:

the analog proximity sensor is an air pressure sensor with an analog electric output that increases as said tip nears said target.

4. A measurement system, comprising:

a gas nozzle mounted for linear movement of a gas exhaust tip that increases the gas backpressure within as said tip is brought nearer to a target workpiece;

an air sensor pneumatically connected to measure said gas backpressure within the gas nozzle and providing an electric signal output;

a servo positioning motor mechanically connected to the gas nozzle and providing for linear movement;

a servo motor controller connected to receive said air sensor electric signal output and providing for a control signal to the servo positioning motor for adjusting the linear position of the gas nozzle to maintain a setpoint gas-exhaust-tip-to-target-workpiece distance as determined from said gas backpressure;

a linear displacement gauge mechanically connected to the gas nozzle and providing for a measurement of the gas nozzle linear displacement; and a measurement combiner connected to receive both said gas nozzle linear displacement measurement from the linear displacement gauge and said air sensor electric signal output and providing for a gauge output that represents the combined gas nozzle linear displacement and gas-exhaust-tip-to-target-workpiece distance;

wherein, a coarsely servo-positioned position of the gas nozzle is precisely determined by the linear displacement gauge, and a precise probe-tip-to-target-workpiece distance is obtained by the measurement combiner from said air sensor electric signal output regardless of an inexact servo-positioning of the gas nozzle by the servo motor.

5. The system of claim 4, wherein:

the gas nozzle, servo positioning motor, and linear displacement gauge are mounted in a measurement head held aloft by a rigid support arm over a stable base and a workpiece is laid on said stable base under said measurement head.

6. The system of claim 4, further comprising:

a calibrator able to interrupt the connection of said the air sensor electric signal output to the servo motor controller and connected to drive the gas nozzle to various linear positions to collect and store air sensor readings of gas backpressures existing at various points indicated by the linear displacement gauge.

7. The system of claim 6, wherein:

the calibrator includes a calibration table for the linearization of the air sensor electric signal output according to gas nozzle linear displacement.

8. The system of claim 4, further comprising:

an x-y table positioned on the stable base and providing for the automated x-y positioning of a workpiece under said gas nozzle.

9. The system of claim 4, further comprising:

a vacuum chuck positioned on the stable base and providing for the locking down of a workpiece under said gas nozzle.

10. The system of claim 6, wherein:

the calibrator includes an x-y table z-axis error model for the z-axis correction of an x-y table which is positioned on the stable base for the automated x-y positioning of a workpiece under said gas nozzle.

11. A semiconductor wafer thickness measurement system, comprising:

a gas nozzle mounted for linear movement of a gas exhaust tip that increases the gas backpressure within as said tip is brought nearer to a target workpiece;

an air sensor pneumatically connected to measure said gas backpressure within the gas nozzle and providing an electric signal output;

a servo positioning motor mechanically connected to the gas nozzle and providing for linear movement;

a servo motor controller connected to receive said air sensor electric signal output and providing for a control signal to the servo positioning motor for adjusting the linear position of the gas nozzle to maintain a setpoint gas exhaust-tip-to-target-workpiece distance as determined from said gas backpressure;

a linear displacement gauge mechanically connected to the gas nozzle and providing for a measurement of the gas nozzle linear displacement;

a measurement combiner connected to receive both said gas nozzle linear displacement measurement from the linear displacement gauge and said air sensor electric signal output and providing for a gauge output that represents the combined gas nozzle linear displacement and gas exhaust-tip-to-target-workpiece distance;

a measurement head in which the gas nozzle, servo positioning motor, and linear displacement gauge are mounted and held aloft by a rigid support arm over a stable base and a workpiece is laid on said stable base under said measurement head;

a calibrator able to interrupt the connection of said the air sensor electric signal output to the servo motor controller and connected to drive the gas nozzle to various linear positions to collect and store air sensor readings of gas backpressures existing at various points indicated by the linear displacement gauge;

a calibration table connected to the calibrator and providing for the linearization of the air sensor electric signal output according to gas nozzle linear displacement;

an x-y table positioned on the stable base and providing for the automated x-y positioning of a semiconductor wafer under said gas nozzle;

a vacuum chuck positioned on the stable base and providing for the locking down of said semiconductor wafer under said gas nozzle;

wherein, the calibrator includes an x-y table z-axis error model for the z-axis correction of the x-y table under the gas nozzle.

* * * * *